United States Patent [19]
Suzuki et al.

[11] Patent Number: 4,930,876
[45] Date of Patent: Jun. 5, 1990

[54] LIQUID CRYSTAL DISPLAY DEVICE

[75] Inventors: Takumi Suzuki, Machida; Kiyohiro Uehara, Tokyo; Hisao Takahashi, Atsugi, all of Japan

[73] Assignee: Ricoh Company, Ltd., Tokyo, Japan

[21] Appl. No.: 263,272

[22] Filed: Oct. 27, 1988

[30] Foreign Application Priority Data

Oct. 30, 1987 [JP] Japan .................. 62-165375
Dec. 19, 1987 [JP] Japan .................. 62-320087
Jul. 26, 1988 [JP] Japan .................. 63-184680

[51] Int. Cl.$^5$ ............................................. G02F 1/13
[52] U.S. Cl. ...................................... 350/336; 350/334; 350/339 R
[58] Field of Search .................. 350/336, 334, 339 R, 350/342, 344

[56] References Cited

U.S. PATENT DOCUMENTS

| | | | |
|---|---|---|---|
| 4,386,293 | 5/1983 | Waldron | 350/336 X |
| 4,425,030 | 1/1984 | Schmidt | 350/339 R |
| 4,457,589 | 7/1984 | Tamura et al. | 350/336 |
| 4,640,581 | 2/1987 | Nakamowatari et al. | 350/336 X |
| 4,789,712 | 11/1988 | Ukai et al. | 350/333 |
| 4,810,061 | 3/1989 | Nakanowatari et al. | 350/336 X |

FOREIGN PATENT DOCUMENTS 0070529 6/1981 Japan .................. 350/336
0112128 5/1987 Japan .................. 350/336

*Primary Examiner*—Stanley D. Miller
*Assistant Examiner*—Huy K. Mai
*Attorney, Agent, or Firm*—Oblon, Spivak, McClelland, Maier & Neustadt

[57] ABSTRACT

A liquid crystal display device including a pair of transparent baseplates which are opposed to each other. A pair of transparent electrodes are disposed on an inner surface of each of the baseplates. A sealing member is disposed so as to form a chamber between the baseplates for containing therein the transparent electrodes and a liquid crystal. Contact electrodes are disposed on one end portion of the inner surface of each of the baseplates for contacting with a pair of external electrodes to be inserted into the device, from the external electrodes a signal to control optical transmission/screening of the liquid crystal being received. A pair of connecting electrodes are disposed on the inner surface of each of the baseplates for electrically connecting the contact electrodes with the transparent electrodes in order to transmit the signal from the contact electrodes to the transparent electrodes. The device is constructed so that the connecting electrodes are not electrically conducted with each other.

4 Claims, 6 Drawing Sheets

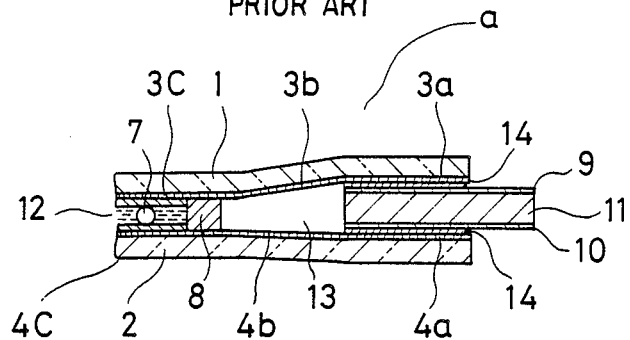
Fig. 1 PRIOR ART
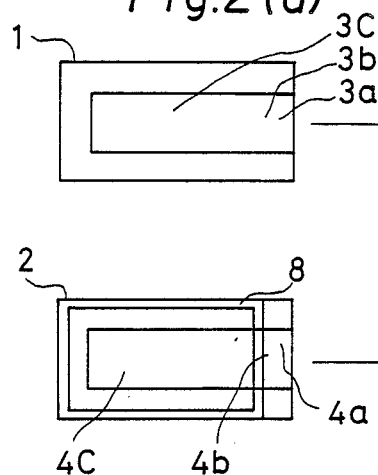
Fig. 2(a) PRIOR ART
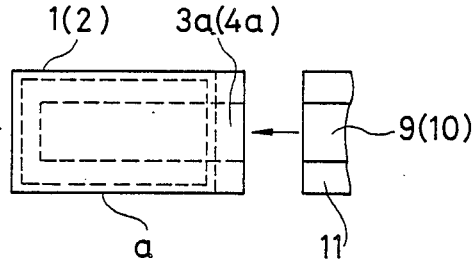
Fig. 2(c) PRIOR ART
Fig. 2(b) PRIOR ART
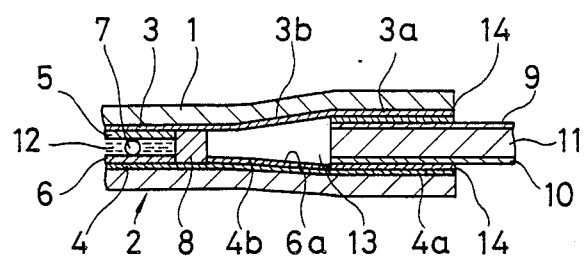
Fig. 3

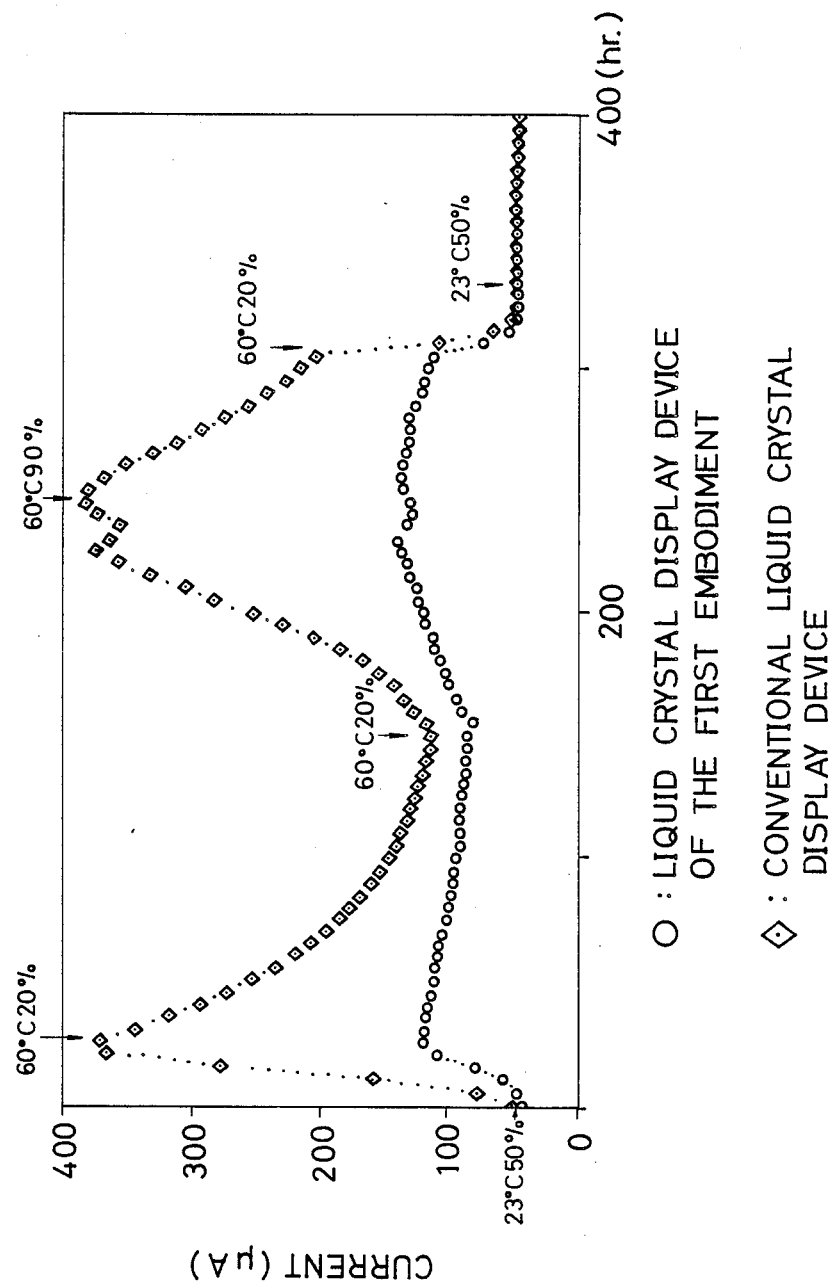

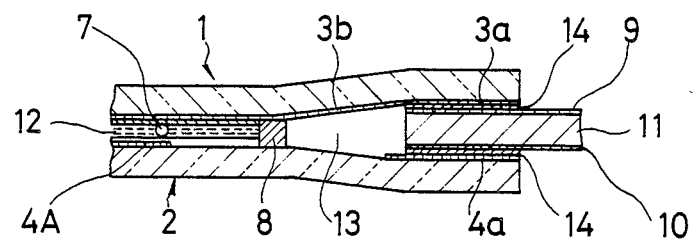
Fig. 6
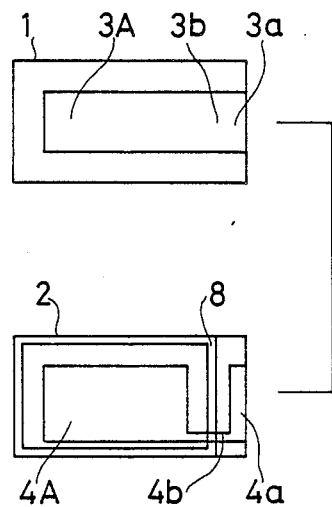
Fig. 7(a)
Fig. 7(b)
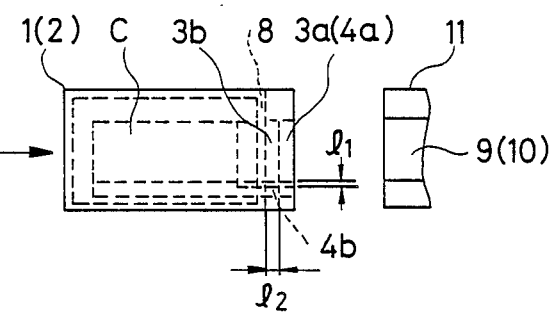
Fig. 7(c)

Fig.9(a)
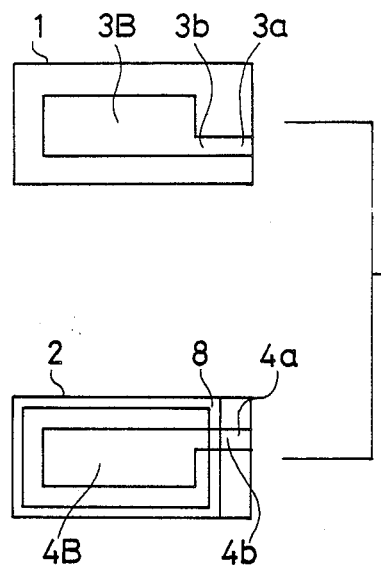
Fig.9(b)
Fig.9(c)
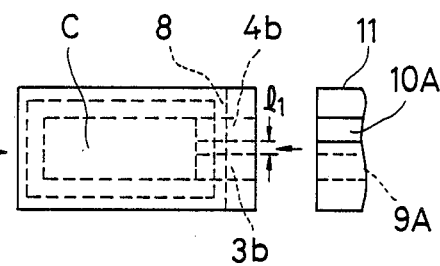

LIQUID CRYSTAL DISPLAY DEVICE

BACKGROUND OF THE INVENTION

The present invention relates to a liquid crystal display device having a connector.

The applicant developed a liquid crystal display device which includes a liquid crystal cell comprising a pair of baseplates of polymer films between which liquid crystal is enclosed, the baseplates each having a transparent electrode thereon; a connector for connecting the liquid crystal cell with an external circuit; and a pair of connecting electrodes for connecting a pair of contact electrodes formed inside the connector with the transparent electrodes of the liquid crystal cell. The liquid crystal display device can be used at room temperature and at normal humidity without causing any problems. However, if such a device is placed in condition of high temperature and high humidity, moisture will enter a space formed by the pair of the connecting electrodes, so that an insulation between the connecting electrodes is deteriorated to increase a consumption of an electric current, a voltage applied across the transparent electrodes is dropped and a contrast is lowered. Further, in such a liquid crystal display device, the connecting electrodes are formed on inner surfaces of a pair of base plates of polymer films. Therefore, the connecting electrodes may contact with each other since the polymer films may be thermally deformed under the condition of high temperature and high humidity. Once such a undesirable situation occurs, the liquid crystal display device will not return to its normal state unless it is placed under a condition of room temperature and normal humidity for more than one day.

If the connector and the liquid crystal cell of the display device are placed close to each other to eliminate the space defined by the connecting electrodes in order to eliminate such drawbacks, the baseplates of the liquid crystal cell combined with each other by a sealing member may come off from the sealing member when electrodes of the external circuit are inserted into the connector.

SUMMARY OF THE INVENTION

It is therefore an object of the present invention to provide a liquid crystal display device in which the insulation between the connecting electrodes is not deteriorated even if the device is placed under the condition of high temperature and high humidity.

The above object of the present invention is achieved by a liquid crystal display device comprising:
  a pair of transparent baseplates which are opposed to each other;
  a pair of transparent electrodes each disposed on an inner surface of each of the baseplates;
  a sealing member disposed so as to form a chamber between the baseplates for containing therein the transparent electrodes and a liquid crystal;
  a pair of contact electrodes each disposed on one end portion of the inner surface of each of the baseplates for contacting with a pair of external electrodes to be inserted into said device, from said external electrodes a signal to control optical transmission/screening of the liquid crystal being received; and
  a pair of connecting electrodes each disposed on the inner surface of each of the baseplates for electrically connecting the contact electrodes with the transparent electrodes in order to transmit the signal from the contact electrodes to the transparent electrodes;
  said device being constructed so that said connecting electrodes are not electrically conducted with each other.

Further objects and advantages of the present invention will be apparent from the following description of the preferred embodiments of the invention as illustrated in the accompanying drawings.

BRIEF DESCRIPTION OF THE DRAWINGS

FIG. 1 is a cross sectional view of a conventional liquid crystal display device.

FIGS. 2(a), (b) and (c) illustrate the steps of manufacturing the liquid crystal display device of FIG. 1.

FIG. 3 is a cross sectional view of a first embodiment of the liquid crystal display device according to the present invention.

FIG. 5 illustrates the difference in the environmental dependency of the consumed electric current between the liquid display device of the first embodiment of the invention and the conventional liquid display device.

FIG. 6 is a cross sectional view of a second embodiment of the liquid crystal display device according to the present invention.

FIGS. 7(a), (b) and (c) illustrate the steps of manufacturing the liquid crystal display device of FIG. 6.

FIGS. 9(a), (b) and (c) illustrate a modification of the second embodiment.

DESCRIPTION OF THE PREFERRED EMBODIMENTS

Figure 4A:
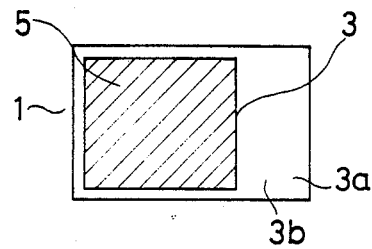
FIGS. 4(a), (b), (c), (d) and (e) illustrate the steps of manufacturing the liquid crystal display device of FIG. 3.

FIG. 1 is a cross sectional view of a conventional liquid crystal display device with a connector recently developed by the applicant.

The liquid crystal display device a of FIG. 1 is manufactured in the steps shown in FIGS. 2(a), (b), (c). Transparent electrodes 3c, 4c; connecting electrodes 3b, 4b; and contact electrodes 3a, 4a are patterned on surfaces of a pair of upper and lower baseplates 1, 2 respectively. Spacers 7 are dispersed on the upper baseplate 1 and a sealing member 8 is printed on a surface of the lower baseplate 2. Such upper and lower baseplates 1 and 2 are fitted together t provide the liquid crystal display device of FIG. 1.

An external circuit board 11 having electrodes 9 and 10 formed on its both sides is inserted between the contact electrodes 3a and 4a. In this case, a thermoplastic or thermosetting film 14 of anisotropic conductivity is temporarily attached to each of the electrodes 9 and 10 of the external circuit board 11. After the insertion of the circuit board 11, the upper and lower baseplates 1 and 2 are pressed toward each other by a thermal head so that the contact electrodes 3a, 4a and the electrodes 9 and 10 of the external circuit board 11 are respectively jointed.

As the external circuit board 11, a polyimide resin baseplate about 0.16 mm thick both sides of which are covered with copper electrodes each 35 μm thick is used. The transparent electrodes 3c and 4c of the upper and lower baseplates 1 and 2 are spaced by the sealing member 8. Since it is difficult to render the thickness of the board 11 equal to that of the sealing member 8, connecting electrodes 3b and 4b defining a chamber 13 are provided to separate the board 11 from the sealing member 8. The liquid crystal display device, in which the chamber 13 is provided between the sealing member 8 and the circuit board 11 as shown in FIG. 1, brings about no problem in use under the condition of room temperature and normal humidity.

However, if such a device is left in high temperature and high humidity, moisture may enter the chamber 13 and the circuit board 11 may be thermally deformed. Thus, as mentioned above, the consumption of the electric current increases and contrast is deteriorated.

A first embodiment of the present invention will now be described with reference to FIGS. 3, 4 and 5.

FIG. 3 shows a liquid crystal display device of the first embodiment and FIGS. 4(a), (b), (c), (d) and (e) illustrate the steps of manufacturing the liquid crystal display device.

Figure 4B:
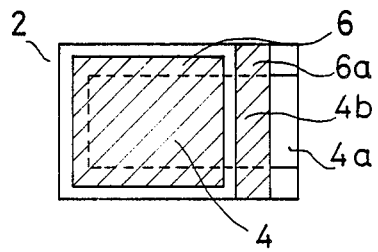

A polymer film is used for each of the upper and lower baseplates 1 and 2. A transparent electrode 3, a connecting electrode 3b and a contact electrode 3a, all of which are not patterned are provided on the upper baseplate 1. A transparent electrode 4, a connecting electrode 4b and a contact electrode 4a, all of which are patterned are provided on the lower baseplate 2. As shown in FIG. 4(a), an orienting material 5 is printed in the upper surface of the transparent electrode 3 of the upper baseplate 1, and as shown in FIG. 4(b), an orienting material 6 is printed in the upper surface of the transparent electrode 4 of the lower baseplate 2 as in the conventional device. Further, an orienting material 6a is printed in the upper surface of the lower baseplate 2 so as to cover the connecting electrode 4b.

Figure 4C:
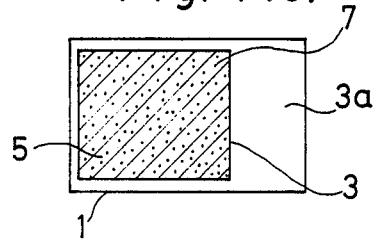
Figure 4D:
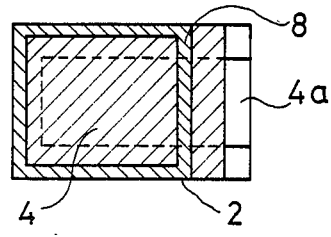

As shown in FIGS. 4(c) and (d), spacers 7 are dispersed on the orienting material 5 and a sealing member 8 is printed in the periphery of the lower baseplate 2.

Figure 4E:
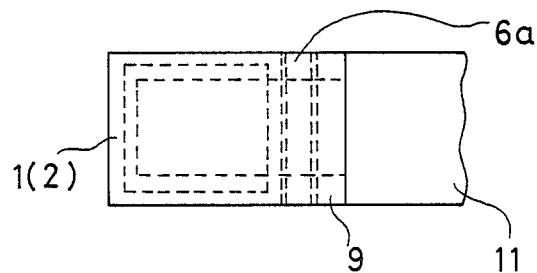

The resulting upper and lower baseplates are adhered to each other by the sealing member 8 and liquid crystal 12 is poured into the space formed by the baseplates 1, 2 and the sealing member 8. As shown in FIG. 4(e), the external circuit board 11 is inserted between the contact electrodes 3a and 4a.

By the above manufacturing steps, the liquid crystal display device shown in FIG. 3 is produced. By the electrical insulation provided by the orienting material 6a covering the connecting electrode 4b, a short circuit between the upper and lower baseplates is prevented even if moisture enters the chamber 13 or even if the internal surfaces of the upper and lower baseplates contact with each other due to thermal deformation thereof when the liquid crystal display device is left under the condition of high temperature and high humidity. Reference numerals 9 and 10 each denotes an external electrode provided on the sides of external circuit board 11 and reference numeral 14 denotes an anisotropic conductive film.

Although the orienting material is printed on the lower baseplate 2 in the above embodiment it may be printed on the upper baseplate 1 or on both the baseplates.

The orienting material 6a is made of the same material as the orienting material 6. Therefore, by the use of a proper printing mask, both the orienting materials 6 and 6a can be printed simultaneously, and the sintering conditions can be the same. Further, both the orienting materials 6 and 6a may be simultaneously subjected to a rubbing process.

As described above, the provision of the orienting material 6a does not increase the number of conventional manufacturing steps.

FIG. 5 shows variations in electrical currents consumed by the conventional liquid crystal display device and the device of the particular embodiment placed in the same condition of high temperature and high humidity. FIG. 5 shows that an increase in the electrical current consumption is satisfactorily suppressed in the device of the particular embodiment having the orienting material 6a. The liquid crystal display device used in this experiment has the orienting material printed on only one of the baseplates.

Although, in the first particular embodiment the upper and lower baseplates are made of polymer films, one of the baseplates may be made of a polymer film and the other may be made of a glass plate.

A second embodiment of the present invention will now be described with reference to FIGS. 6, 7 and 8.

In the liquid crystal display device of FIG. 6, the connecting electrodes 3b and 4b formed on the upper and lower baseplates 1 and 2, respectively, of polymer films have such shapes that they have no portions opposing with each other.

As shown in FIG. 7(a), the transparent electrode 3A, connecting electrode 3b and contact electrode 3a formed on the upper baseplate 1 are patterned so as to have the same width. While, as shown in FIG. 7(b), the connecting electrode 4b formed on the lower baseplate 2 is patterned so as to have a width narrower than the transparent electrode 4A and the contact electrode 4a, and to locate itself downwardly from the longitudinal center line of the lower baseplate 2. Therefore, even if the inner surfaces of the upper and lower baseplates 1 and 2 may contact with each other in the chamber 13, the connecting electrodes 3b and 4b will not contact with each other.

As shown in FIG. 7(c), the connecting electrodes 3b and 4b on the upper and lower baseplates adhered to each other with the sealing member 8 are vertically spaced by a distance $l_1$. The sealing member 8 and the contact electrode 4a are spaced by a distance $l_2$. The connecting electrodes 3b and 4b are not opposed to each other.

As shown in FIG. 6, the external circuit board is inserted between the contact electrodes of the liquid crystal display device having such connecting electrodes.

In FIG. 6, external electrodes 9 and 10 are formed on the both sides of the external circuit board 11. The connecting electrodes 3b and 4b are disposed so as not to overlap with each other in the chamber 13 between the sealing member 8 and the external circuit board 11. Reference numeral 12 denotes liquid crystal and reference numeral 7 denotes spacers. Anisotropic conductive films 14 are disposed between electrodes 9, 10 of the circuit board 11 and the contact electrodes 3a, 4a of the upper and lower baseplates 1, 2 respectively for tight connections of these electrodes.

In the second embodiment, the external circuit board 11 may be a polyimide baseplate both sides of which are covered with copper films each 35 μm thick which are gold-plated by 0.5 82 m thickness. The anisotropic conductive film may be made of "ANISOLM AC5052" manufactured by Hitachi Chemical Co., Ltd. The distances $l_1$ and $l_2$ of FIG. 7(c) may be set to 0.5 mm and 1 mm, respectively.

Figure 8:
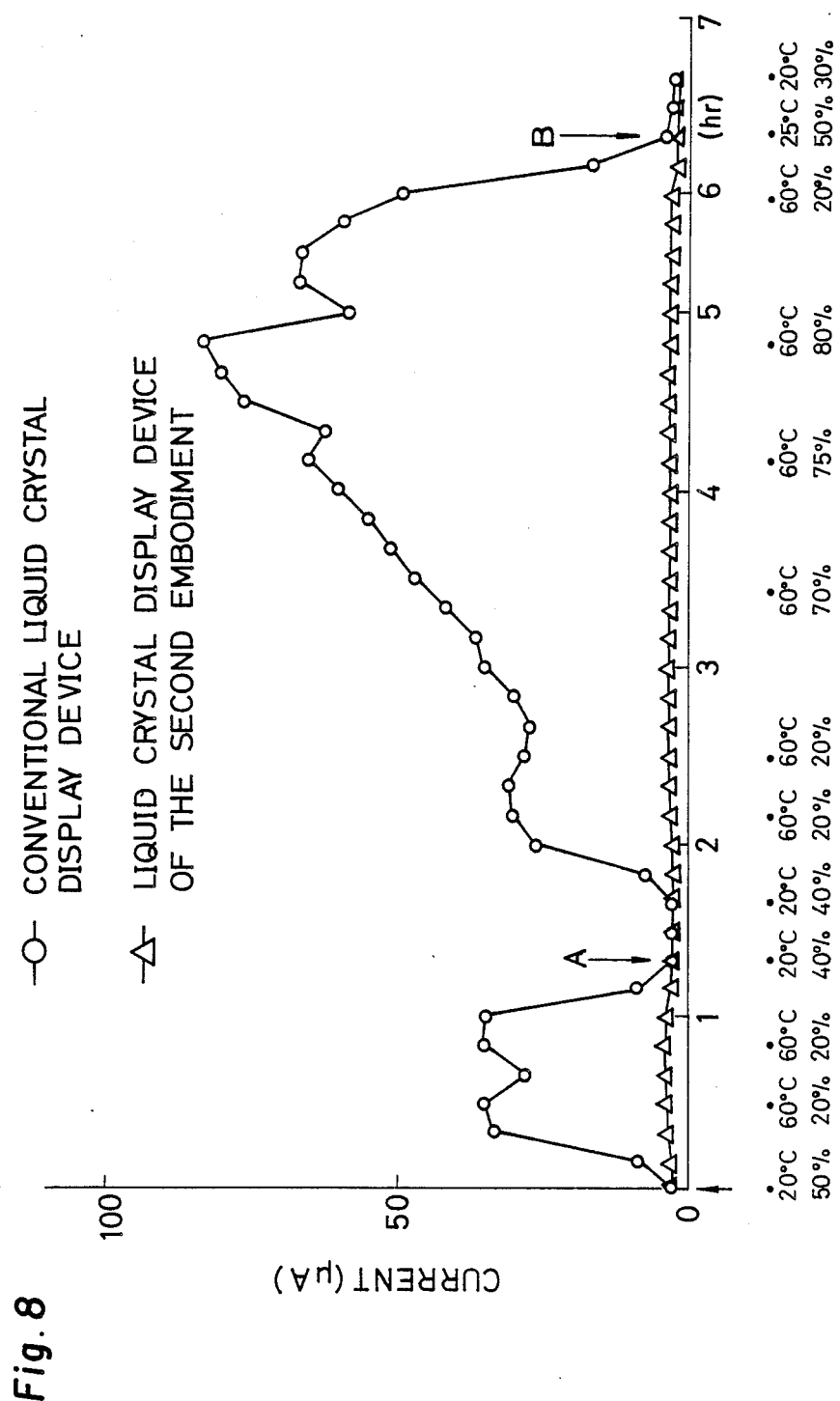
FIG. 8 illustrates the difference in the environmental dependency of the consumed electric current between the liquid display device of the second embodiment of the invention and the conventional liquid display device.

FIG. 8 shows variations in electrical currents consumed by the conventional liquid crystal display device and the device of the second embodiment placed in the same condition of high temperature and high humidity.

As shown in FIG. 8, in the conventional device, the electrical current varies according to the environmental temperature and humidity. The current is restored to its initial value at points A and B, which indicates that thermal deformation of the upper and lower baseplates is temporarily restored. In contrast, in the liquid crystal display device of the particular embodiment, the electrical current is not virtually varied according to the environmental temperature and humidity. Although not shown, the display contrast of the particular embodiment is not virtually influenced by the environmental temperature and humidity.

FIGS. 9(a), (b), (c) show a modification of the second embodiment. As shown in FIGS. 9(a) and (b), connecting electrode 3b is provided below the longitudinal center line of the upper baseplate 1, while the other connecting electrode 4b is provided above the longitudinal center line of the lower baseplate 2.

As shown in FIG. 9(c), in the liquid crystal display device of the modification of the second embodiment, it is necessary to provide, the distance $l_1$ between the connecting electrodes 3b and 4b, but not necessary to provide the distance $l_2$. Therefore, it is easy to design the device of this modification compared to the device of FIG. 7(c).

In order to pattern electrodes on the upper and lower baseplates of the respective embodiments, a photolithographic process, a process in which the electrodes are rubbed to remove unnecessary portions of the electrodes or a laser trimming may be used.

Many widely different enbodiments of the present invention may be constructed without departing from the spirit and scope of the present invention. It should be understood that the present invention is not limited to the specific embodiments described in the specification, except as defined in the appended claims.

What is claimed is:

1. A liquid crystal display device comprising:
 a pair of transparent baseplates which are opposed to each other;
 a pair of transparent electrodes each disposed on an inner surface of each of the baseplates;
 a sealing member disposed so as to form a chamber between the baseplates for containing therein the transparent electrodes and a liquid crystal;
 an orientating material covering at least one of said baseplates inside said chamber;
 a pair of contact electrodes each disposed on one end portion of the inner surface of each of the baseplates for contacting with a pair of external electrodes to be inserted into said device, from said external electrodes a signal to control optical transmission/screening of the liquid crystal being received;
 a pair of connecting electrodes each disposed on the inner surface of each of the baseplates for electrically connecting the contact electrodes with the transparent electrodes in order to transmit the signal from the contact electrodes to the transparent electrodes; and
 an insulating film having substantially the same thickness and composition as said orientating material placed in those areas of said at least one baseplate that are not contacted by said contact electrodes and not inside said chamber.

2. A liquid crystal display device according to claim 1, wherein at least one of the baseplates is made of a polymer film.

3. A liquid crystal display device according to claim 1, wherein the connecting electrodes are disposed at such positions that they are not overlapped with each other in order that they will not be electrically conducted with each other.

4. A liquid crystal display device according to claim 3, wherein at least one of the baseplates is made of a polymer film.

* * * * *